United States Patent [19]
Moran et al.

[11] Patent Number: 5,535,357
[45] Date of Patent: *Jul. 9, 1996

[54] FLASH MEMORY SYSTEM PROVIDING BOTH BIOS AND USER STORAGE CAPABILITY

[75] Inventors: Dov Moran, Kfar Saba; Rony Levy, Tel Aviv; David Deitcher, Raanana; Arie Mergui; Amir Ban, both of Tel Aviv; Anatoly Yurtsev, Ramat Gan, all of Israel

[73] Assignee: M-Systems Flash Disk Pioneers Ltd., Tel Aviv, Israel

[ * ] Notice: The term of this patent shall not extend beyond the expiration date of Pat. No. 5,519,843.

[21] Appl. No.: 465,023

[22] Filed: Jun. 5, 1995

Related U.S. Application Data

[63] Continuation of Ser. No. 31,713, Mar. 15, 1993.

[51] Int. Cl.⁶ .............................. G06F 12/00; G11C 8/00
[52] U.S. Cl. .......................... 395/430; 395/412; 395/500; 364/244.6; 364/245.2; 364/246.3; 364/256.3; 364/DIG. 1; 364/244.5
[58] Field of Search ..................................... 395/425, 325, 395/800, 500, 700, 430, 431, 412, 479; 365/900, 218, 49, 230.01; 364/431.12

[56] References Cited

U.S. PATENT DOCUMENTS

| | | | |
|---|---|---|---|
| 5,109,521 | 4/1992 | Culley | 395/800 |
| 5,131,089 | 7/1992 | Cole | 395/500 |
| 5,136,711 | 8/1992 | Hugard et al. | 395/700 |
| 5,168,465 | 12/1992 | Harari | 257/320 |
| 5,196,722 | 3/1993 | Bergendahl et al. | 257/304 |
| 5,210,875 | 5/1993 | Bealkowsky et al. | 395/700 |
| 5,218,691 | 6/1993 | Tuma et al. | 395/500 |
| 5,245,572 | 9/1993 | Kosonocky et al. | 365/185.11 |
| 5,260,555 | 11/1993 | Sakamoto | 235/492 |
| 5,263,003 | 11/1993 | Cowles et al. | 365/230.03 |
| 5,278,759 | 1/1994 | Berra et al. | 364/424.01 |
| 5,291,584 | 3/1994 | Chella et al. | 395/500 |
| 5,293,606 | 3/1994 | Sassenrath | 395/853 |
| 5,305,384 | 4/1994 | Ashby et al. | 380/29 |
| 5,371,876 | 12/1994 | Ewertz et al. | 395/425 |
| 5,394,030 | 2/1995 | Jennings | 326/41 |
| 5,404,485 | 4/1995 | Ban | 395/412 |
| 5,410,707 | 4/1995 | Bell, III et al. | 395/700 |
| 5,444,664 | 8/1995 | Kuroda et al. | 365/226 |
| 5,459,850 | 10/1995 | Clay et al. | 395/497.02 |
| 5,473,765 | 12/1995 | Gibbons et al. | 395/500 |
| 5,479,639 | 12/1995 | Ewertz et al. | 395/430 |
| 5,485,595 | 1/1996 | Assar et al. | 395/430 |

*Primary Examiner*—Gopal C. Ray
*Attorney, Agent, or Firm*—Mark M. Friedman

[57] ABSTRACT

A flash memory system having a controller and a flash memory device for providing BIOS, operating system and user storage capabilities is provided. According to exemplary embodiments of the present invention, flash memory systems can be designed as integrated circuit packages which are pin compatible with conventional ROM BIOS chips so that existing systems can be readily upgraded without extensive modifications.

19 Claims, 4 Drawing Sheets

FLASH MEMORY SYSTEM PROVIDING BOTH BIOS AND USER STORAGE CAPABILITY

This is a continuation of U.S. patent application Ser. No. 08/031,713, filed Mar. 15, 1993.

FIELD AND BACKGROUND OF THE INVENTION

The present invention relates generally to computers and personal digital assistants, and more specifically to an integrated circuit providing both the functionality of BIOS routines and user storage.

Today, every computer and personal digital assistant uses some type of permanent memory to store the software code that provides essential low-level services, commonly called Basic Input/Output Services (BIOS), some type of storage device to provide access to an operating system that provides higher level services, and some type of storage device that allows a user to run application programs and retrieve stored data. For example, a typical configuration in a personal computer is to have the BOIS stored in an integrated circuit located on the motherboard, the operating system stored on a magnetic hard disk drive which has an I/O interface with the motherboard, and to provide volatile memory chips (RAM) into which programs or parts of programs are retrieved from a secondary storage device (e.g., hard disk drive or floppy disk drive) for operation.

While this configuration has proven to be effective, this technology has been, and confines to be, driven by the need for smaller and more powerful computers. The dramatically increasing popularity of laptop and palmtop computers, to be followed in the near future by personal digital assistants, evidences the market pressure for continued technological advances which will allow further miniaturization without sacrificing performance.

Since both magnetic hard disk drives and floppy disk drives are relatively large and somewhat susceptible to mechanical failure, they have become a target for improvement by system designers. Accordingly, one of the many results of this pressure to miniaturize was the development of solid state disk technology (SSD). The basic concept behind SSD technology is to use integrated circuits, e.g., ROMs, RAMs, and EPROMs, not only as primary system memory, but also as secondary storage so that hard and/or floppy disk drives can be eliminated. Solid state disks have the additional benefits of being smaller, more rugged and consuming less power than conventional magnetic storage.

A newer type of solid state memory, called flash memory, has recently been used in SSD applications. Flash memory components comprise arrays of electrically erasable programmable read-only memory (EEPROM) devices which can be simultaneously erased. Flash memory components have very favorable attributes for use in SSD applications including fast access, low power consumption, high reliability and relatively low cost. Unfortunately, flash devices also have the drawback of being erasable at a block level only. This constraint has conventionally relegated flash memory to the role of read-only memory, which is undesirable in devices purporting to be a substitute for secondary storage devices such as hard disk drives which provide read/write functionality.

Moreover, despite the technical advances in this area, a completely integrated solution has not yet been developed. In particular, there is a need for the various memory devices which store required code, such as the BIOS and the operating system, as well as optional code, such as a user's applications, to be integrated into a single package. This need has not yet been satisfied by today's products.

SUMMARY OF THE INVENTION

Accordingly, the present invention provides solutions to the aforementioned problems by providing, according to exemplary embodiments thereof, the BIOS, an operating system and user storage in a single integrated circuit package. This object is achieved, for example, by providing an application specific integrated circuit (ASIC) controller in conjunction with at least one flash memory device. Thus, according to exemplary embodiments of the present invention, a flash memory system provides all of the functionality of the BIOS, an operating system and a hard disk, which has previously been found only in separate components.

Further, according to an exemplary embodiment of the present invention, a flash memory system which provides the functionality of BIOS, an operating system, and user storage, is designed as a single integrated circuit package which is pin compatible with existing ROM BIOS chip. This feature provides, among other advantages, for easy and cost-effective retrofitting of existing computers and personal digital assistants by simply replacing a ROM BIOS chip.

Moreover, flash memory systems according to the present invention provide many advantages when incorporated into, for example, portable computer systems and personal digital assistants. For example, such flash memory systems provide faster access times and have lower assembly costs than conventional hard disk drive units, are lower in price than SRAM, and require less space on system boards than other storage solutions.

BRIEF DESCRIPTION OF THE DRAWINGS

These and other objects, features, and advantages of the present invention will become more apparent upon reading the following detailed description in conjunction with the drawings in which.

DESCRIPTION OF THE PREFERRED EMBODIMENTS

Figure 1:
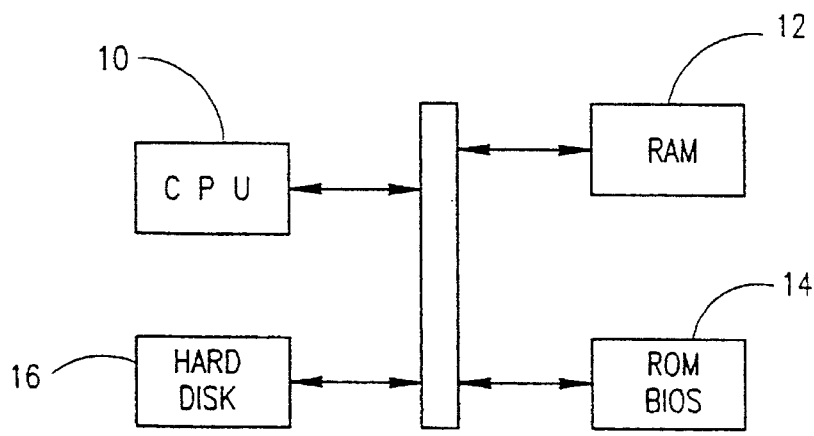
FIG. 1 is a block diagram of a conventional computer system.

As mentioned above, the present invention is applicable to all types of computers and personal digital assistants wherein a ROM BIOS chip or an analogous chip is typically used to store low-level routines. FIG. 1 very generally illustrates a layout of some of the typical components of such systems, including g a CPU or microprocessor 10, a system memory (RAM) 12, a ROM BIOS chip 14, and a hard disk drive unit 16, all of which receive data from, and place data on, a system bus 18.

Figure 2:
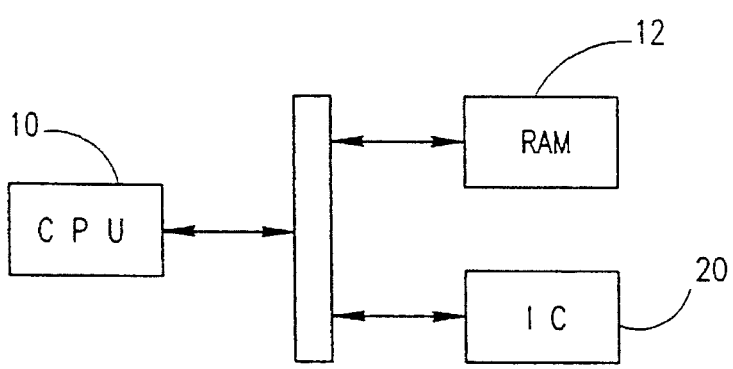
FIG. 2 is a block diagram of an exemplary system according to the present invention.

According to exemplary embodiments of the present invention, the ROM BIOS chip is replaced by a flash memory system chip which includes the BIOS as well as a solid state disk which is designed to emulate, for example, storage provided by a hard disk unit. Such a system is shown by the block diagram of FIG. 2, wherein the flash memory system 20 replaces the ROM BIOS chip 14. Also omitted from FIG. 2 is the hard disk drive unit 16 of FIG. 1 since, as will be described in more detail below, the flash memory system can eliminate the need for a hard disk drive unit. Of course, for systems requiring large amounts of secondary storage, hard disk drive unit(s) could be retained or a memory card could be added.

Figure 3:
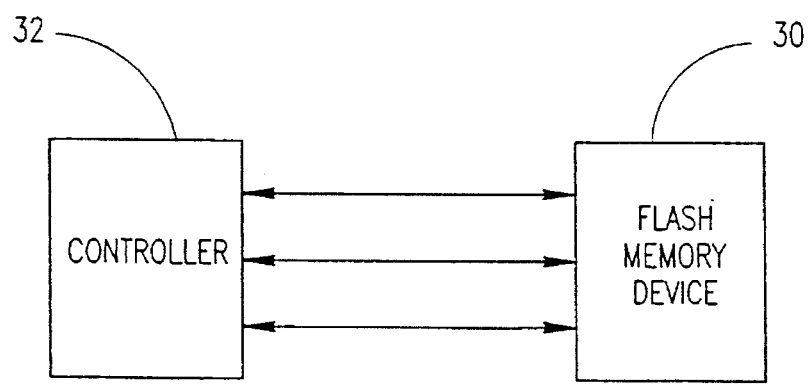
FIG. 3 is a block diagram of a flash memory system according to the present invention.

As seen in FIG. 3, flash memory systems according to exemplary embodiments of the present invention comprise two basic functional units. A flash memory device 30 provides the storage capability for the integrated circuit package and a controller 32 provides logic functions which are used to interface the flash memory device 30 with the rest of the system via the system bus. The flash memory device 30 comprises one or more flash memory units.

Figure 4:
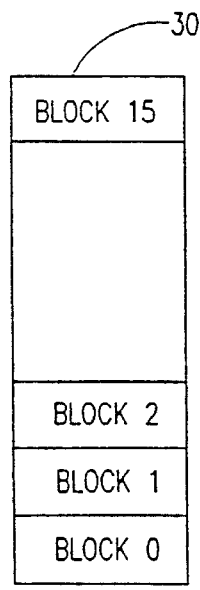
FIG. 4 is a memory map of a flash memory device according to an exemplary embodiment.

FIG. 4 is a memory map showing how 1MB of storage in the flash memory device 30 can be used in this exemplary embodiment. The memory is divided into 16 blocks of 64KB each. The first block (block 0) contains a flash file system which is used to control blocks 2–15 so that they emulate, for example, a hard disk. Block 1 contains the BIOS. Although some of the features of the flash file system contained in block 0) will be discussed by way of the following description of the overall operation of integrated circuit package 20, the details of this flash file system are beyond the scope of the present disclosure. A suitable flash file system is more fully described in U.S. patent application Ser. No. 08/027,131, filed on Mar. 8, 1993, and entitled "Flash File System", now U.S. Pat. No. 5,404,485 which is incorporated herein by reference.

The controller 32 provides and controls a window between the system memory 12 and the flash device 30. Throughout this disclosure the term "window" is used to refer to a memory mapping scheme between the flash memory device 30 and the system memory 12. When the CPU attempts to access an address in the system memory 12 within the window, a corresponding address in the flash memory device 30 is actually accessed. During start-up, the window can be shifted so as to function either as a window into the BIOS stored in block 1 of the flash memory device 30 or as a window into the flash file system stored in block 0 of the flash memory device.

Figure 5:
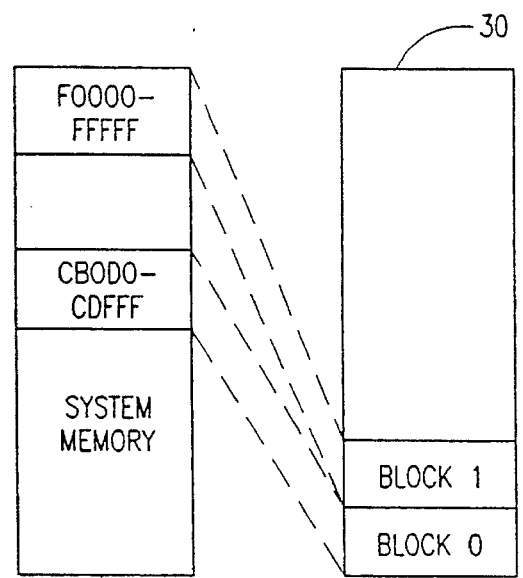
FIG. 5 illustrates windows opened between a flash memory device and system memory according to an exemplary embodiment.

This feature is diagrammatically illustrated by the dotted lines between the system memory 12 and the flash memory device 30 in FIG. 5. In the example illustrated therein, addresses F0000–FFFFF in the system memory 12 are mapped to addresses in block 1 of the flash memory, and addresses CB0D0–CDFFF in the system memory 12 are mapped to addresses in block 1 of the flash memory, and addresses CB0D0–CDFFF in the system memory are mapped to addresses in block 0 of the flash memory. Of course, it will be appreciated that other groups of addresses in the system memory 12 could be mapped to corresponding addresses in the flash memory 30.

Figure 6:
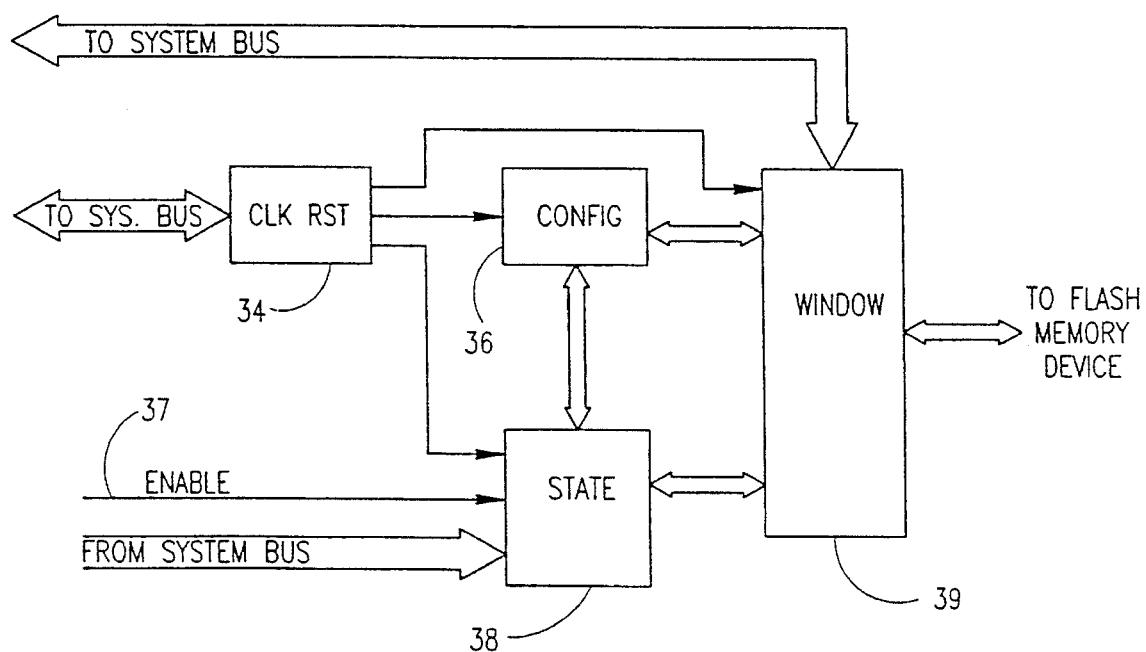
FIG. 6 is a block diagram of a controller according to an exemplary embodiment of the present invention.

FIG. 6 illustrates an exemplary arrangement for the controller 32, in block diagram form. A CLKRST circuit 34 receives clocking information from the system bus 18 and provides clock signals and reset signals to the other components of the controller 32. A CONFIG circuit 36 reads stores the configuration of the flash memory device, e.g., the information indicating where the BIOS and flash file system are stored.

A STATE circuit 38 receives information pertaining to the configuration of the flash memory device 30 and detects access of system memory addresses within the current window. The STATE circuit 38 also identifies and interprets certain attempts to read individual or sequential system memory addresses as instructions to the controller. For example, as described below, accesses to certain addresses are identified as commands to move the window. In response to these control sequences, the STATE circuit 38 switches the window between the BIOS block (block 1) and the flash file system block (block 0). A WINDOW circuit 39 implements the movable window between the flash memory device 32 and system memory 12 based on information and instructions from the CONFIG and STATE circuits. The operation of the flash memory system will now be described.

At power-on, the controller 32 performs a reset and opens a window as a 64KB window into the BIOS stored in block 1 of the flash memory device 30. Since there is no reset (RST) pin on BIOS chips or on integrated circuit packages according to exemplary embodiments of the present invention which are compatible therewith, the controller 32 performs a read from address FFFF0 in the system memory 12, where the BIOS reset vector is located, which results in an internal reset. Any read from this address will be identified by the STATE circuit 38 as an instruction to the controller 32 to switch the window to block 1 containing the BIOS. During this time, the WINDOW circuit 39 causes external addresses to be mapped directly to the flash addresses in block 1 of the flash memory.

At a point in the BIOS reset routine after the system memory has been initialized, but before the BIOS begins accessing the hard of floppy disk drives, the controller 32 intercepts the disk boot process. In the disclosed embodiment, this operation is carried out by inserting an instruction that causes the system to jump in place. When the controller later detects that the system is jumping in place, the controller switches the window to the flash file system stored in block 0 of the flash memory device 30, and inserts an instruction that causes the CPU 10 to jump to the beginning of the flash file system. The flash file system installs itself into the system memory 12, and the system update is completed.

More specifically, when the integrated circuit package 20 is powered up, the CONFIG circuit 36 of controller 32 reads data, for example from addresses FFFC and FFFD of block 0 of the flash memory device 30, and writes this data into a register. The value stored in the register is the insertion address which is the point in the BIOS reset routine where the controller 32 inserts the jump-in place instruction as above. This step of initially reading the insertion address from the flash memory 30 at the onset of a reset operation is carried out because the desired insertion address can vary among different BIOS versions. Thus, the memory system of the present invention is readily suited to be used with any type of BIOS.

The insertion address is located in segment F000 so that the access to the insertion address will be within the open window and, thus, will be detected by the STATE circuit 38 of controller 32. Preferably, the area of the system memory 12 that includes the insertion address is not used as cache memory to avoid the possibility that the system would always see the first jump-in-place instruction and hang up.

Figure 7:
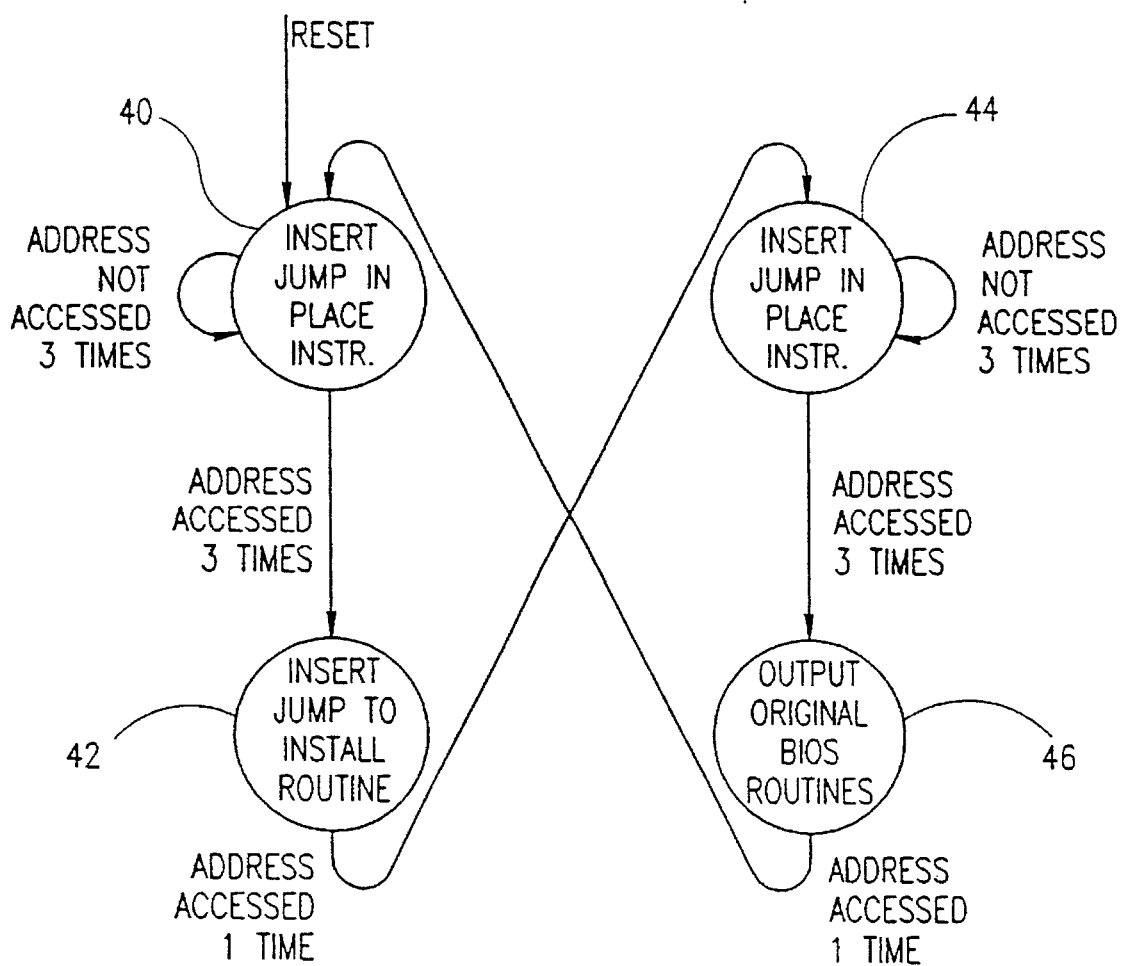
FIG. 7 is a state diagram illustrating operation of a controller according to an exemplary embodiment.

FIG. 7 illustrates the state changes of the controller 32 during a reset operation. As described above, upon receipt of a reset command the controller enters a first state 40 and intercepts the disk boot process, i.e. it outputs the jump-in-place instruction at the proper time in the BIOS routine. After the insertion address stored in the register has been consecutively accessed a number of times, e.g. three times, the controller 32 moves to a second state 42 and inserts the instruction to jump to the beginning of the flash system that is stored in block 0 of the flash memory device 30. The reading of the register a number of times in succession prevents routine data fetches from accidentally triggering the installation of the flash system stored in the flash memory device since such routine data fetches are not likely to return to the same address three times in succession. Although three consecutive reads from the insertion address are used in this exemplary embodiment to confirm that the processor is performing an instruction fetch from the insertion address rather than a data fetch, those skilled the art will appreciate that two or four or more consecutive reads could be used, depending on the amount of redundancy desired for a particular system.

Once the controller has inserted the instruction to jump to the system install routine, the flash system is installed into the system memory 12. Thereafter, the CPU returns to the insertion address, i.e., the point where the BIOS reset routine was interrupted, and the controller again changes state. In a third state 44, the controller block 32 again inserts a jump-in-place instruction at the insertion address. In the same manner as state 40, this state ensures that the current reading of the insertion address is intended to indicate that the flash system has been installed by distinguishing ordinary data fetches from an instruction fetch of the insertion address. After the insertion address is accessed three times consecutively, the controller changes to state 46 and outputs the original contents of the BIOS to resume the reset routine where it left off. Thereafter, the controller internally resets itself to the original state 40, as shown by the arrow leading from state 46 back to state 40, so that it is at the proper state the next time a reset command is issued.

After the flash file system has installed itself into the system memory, the flash file system switches the window back to the BIOS in block 1 of the flash memory device 30 to complete the boot procedure. Whenever the flash file system starts to run, the window is switched to the portion of the flash memory device 30, e.g., blocks 2–15, which provides user storage and can be formatted to emulate, for example, a hard drive. The WINDOW circuit 39 maps external addresses to the appropriate block in the flash memory according to the position of the window.

As mentioned above, switching the window to the BIOS can be accomplished by reading from an address containing an internal reset vector, e.g., address FFFF0. In order to switch the window to the flash memory device, the flash system performs three consecutive reads from addresses FFF00, FE0F0, and FD880. This sequence is detected by the STATE circuit 38 which commands the WINDOW circuit to switch the window. Any other reads during this sequence will cancel the sequence which can then be restarted to switch the window to the flash memory. Instruction fetches performed during the sequence will not interfere because they will not read from the system memory area holding the BIOS. Therefore, a chip enable line 37 to the STATE block 38 will not go low, and the controller 32 will not recognize these instruction fetches as data reads.

If an interrupt occurs while switching the window from the BIOS to the flash, the flash system will access the BIOS and the switching sequence will be canceled. Thus, the interrupts should be disabled during the procedure which switches the window from the BIOS to the flash.

In addition to being able to witch the window between the BIOS and the flash memory device 30, the flash system performs operations for reading the flash memory, positioning the window within the flash memory, erasing the flash memory and writing to the flash memory. When the window is open on the flash, it can be divided into two 32KB sections. The lower 32KB of the window can be used as a read space, and the upper 32KB of the window can be used as a control space. The read space is the actual window into the flash memory. A read from the read space returns the data stored at that location. The control space is used to perform all the operations other than reading from the flash memory.

When the window is open to the flash memory, there can be no accesses to the BIOS. Thus, the flash system will not generate any software interrupts or calls to the BIOS without first switching the window to the BIOS. However, hardware interrupts are frequently generated by the system outside the control of the flash file system, and these interrupts will attempt to directly access the BIOS.

Figure 8:
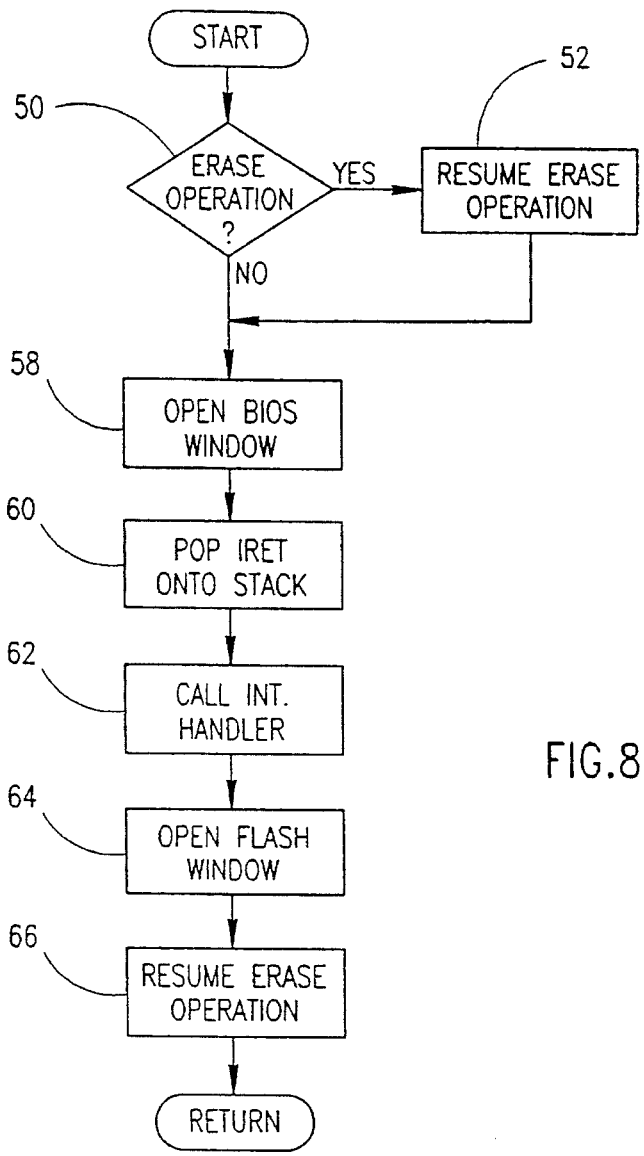
FIG. 8 is a flow chart which illustrates interrupt handling according to an exemplary embodiment.

To handle this situation, the flash file system changes the vectors associated with the hardware interrupts when the flash file system switches the window to the flash memory from the BIOS. The original hardware vectors are stored elsewhere and new vectors are substituted therefor which point to flash file system subroutine. This subroutine is illustrated in FIG. 8 and described below.

In step 50, the flash file system checks to see if an erase operation is in progress. If so, the erase operation is suspended at step 52 and the flow proceeds to step 58. If an erase operation is not in progress, the progress, the process moves directly to step 58 where the window is switched to the BIOS, e.g., by performing a read of address FFFF0. Since read operations typically take only one bus cycle, as compared to the lengthier erase (and write) operations, they will be completed without the need for special handling prior to servicing the hardware interrupt.

Next, the BIOS code is intercepted during flash programming. In the disclosed embodiment, this interception is carried out by preparing a stack so that an interrupt return instruction (IRET) pointing to this subroutine will be executed following servicing; of the hardware interrupt, at step 60. The hardware interrupt handler in BIOS associated with the interrupt generated by the system is called in step 62. When the interrupt has been serviced, the window is shifted back to the flash memory device, e.g., by consecutive reads from addresses FFF00, FE0F0, and FD880, and if there was a suspended erase operation, it is resumed at steps 64 and 66, respectively. Control is then returned to the flash file system stored in system memory 12.

Figure 9:
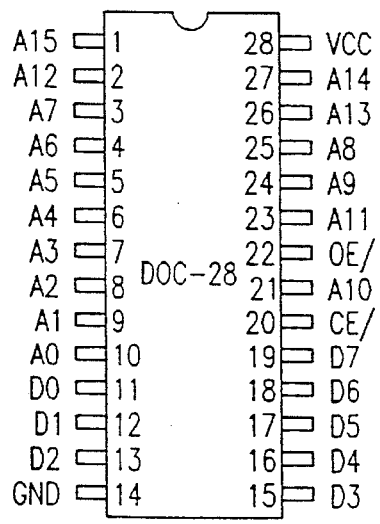
FIG. 9 is a pin diagram of an integrated circuit package according to the present invention.

As mentioned above, exemplary embodiments of the present invention are intended to be pin compatible with existing ROM BIOS chips. Thus, according to one such exemplary embodiment, the integrated circuit 20 can have the pin configuration illustrated in FIG. 9 which is that of a standard EPROM, 28-pin DIP chip. In FIG. 9, pins A0–A15 are used for address inputs, pins D0–D7 are used for data input and output, pin CE is a chip enable, pin OE is an output enable, pin GND is a ground pin and pin VCC is the power pin.

According to an exemplary embodiment of the present invention, after the flash file system has been installed in the system memory and the remaining BIOS initialization routines have been completed, the flash system can then be instructed to load an operating system which is stored in the user storage area (blocks 2–15) of the flash memory device 30 into system memory. At this point, a computer system or personal digital assistant incorporating a flash memory system according to the present invention will have very rapidly performed all of the present invention will have very rapidly performed all of the steps necessary to enable a user to access his or her desired applications without accessing a hard disk drive or a floppy disk drive.

The previous exemplary embodiment has been described in terms of a flash memory system which provides 1MB of storage using a single flash memory device, however those skilled in the art will appreciate that both the size and number of the flash memory devices can be varied. For example, a piggy-back type memory expansion module containing up to three flash memory chips can be added, whereby the disk space can be expanded from 1MB to 2 or 4MB. Alternately, custom modules can be designed having up to eight flash memory devices.

While the present invention has been described with respect to the foregoing exemplary embodiments, these embodiments are intended to be in all respects illustrative rather than limitative or restrictive of the present invention. Thus, for example, although the user storage portion of the flash memory device has been described as begin formatted and used in a manner analogous to that of a hard disk drive, those skilled in the art will readily appreciate that the flash system could use this memory to emulate other types of secondary storage, such as an optical drive.

Accordingly, any and all modifications or changes which are within the spirit and scope of the present invention as embodied by the appended claims are intended to be encompassed thereby.

What is claimed is:

1. A system, comprising:
  system memory means for storing user data;
  central processing means connected to said system memory means for providing control functions of said system;
  a system bus for communicating data between said system memory means, said central processing means and an integrated circuit package;
  said integrated circuit package comprising:
    flash memory means for storing both BIOS routines and said user data; and controller means for interfacing said flash memory means and said system bus, said flash memory means storing emulation means for allowing a portion of said flash memory means to emulate a hard disk and said controller means including means for intercepting a BIOS boot process to install said emulation means in said system memory.

2. The system of claim 1, wherein said controller means provides a window between said flash memory means and said system memory means.

3. The system of claim 2, wherein said controller means includes address means for detecting accesses to system memory addresses within said window.

4. The system of claim 3, wherein said controller means includes shifting means for shifting said window between different portions of said flash memory device.

5. The system of claim 4, wherein said shifting means shifts said window in response to a detection of an access to at least one predetermined system memory address by said address means.

6. The system of claim 5, wherein said shifting means shifts said window to a portion of said flash memory means which emulates a hard disk drive in response to a detection of predetermined sequence of system memory addresses by said address means.

7. The system of claim 1, wherein said intercepting means includes insertion means for inserting a jump-in-place instruction into one of said BIOS routines in response to a system reset.

8. The system of claim 7, wherein said intercepting means further comprises detecting means for detecting when said jump-in-place instructions has been executed a predetermined number of consecutive times.

9. The system of claim 8, wherein said insertion means causes said central processing means to jump to an address in said flash memory means in response to a result of said detecting means, whereby said emulation means is loaded into said system memory.

10. The system of claim 9, wherein said central processing means completes said one of said BIOS routines after said emulation means has been loaded into said system memory.

11. The system of claim 1, wherein said emulation means replaces original hardware interrupt vectors of said system with vectors pointing to a subroutine in said emulation means.

12. The system of claim 1, wherein said emulation means controls reading, writing, and erasing of said portion of said flash memory means.

13. An integrated circuit package, comprising:
  flash memory means for storing both BIOS routines and user data;
  controller means for controlling access; to said flash memory means; and
  pin means connected to said controller means for providing external connections to said integrated circuit package, wherein said flash memory means stores emulation means for allowing a portion of said flash memory means to emulate a hard disk and wherein said controller means includes means for intercepting a BIOS boot process to install said emulation means in the system memory.

14. The integrated circuit package of claim 13, wherein said pin means comprises a 28-pin DIP configuration.

15. The integrated circuit package of claim 13, wherein said intercepting means includes insertion means for inserting a jump-in-place instruction into one of said BIOS routines in response to a system reset received by said pin means.

16. The integrated circuit package of claim 15, wherein said intercepting means further comprises detecting means for detecting when said jump-in-place instruction has been executed a predetermined number of consecutive times.

17. A memory system for computers, comprising: a flash memory device that is divided into at least two portions, a first portion of said flash memory device storing low-level service routines for the operation of a computer, and a second portion of said flash memory device being configured to store user-designated information and a controller which operates as an interface between said flash memory device and an associated computer system, said controller including:
  windowing means for mapping external addresses of the associated computer system to addresses in a selected portion of said flash memory device, to thereby establish a window to said selected portion of said flash memory device, and means connected to said windowing means responsive to memory accesses by the computer system for switching the selected portion of said flash memory device between said first and second portions, wherein said second portion of the flash memory device includes a first block of memory which stores a flash file management system, and at least one other block of memory which is adapted to store user-designated data.

18. The memory system of claim 17, wherein said switching means is responsive to a command to reset the computer system to cause said windowing means to first establish a window to said first portion of said flash memory device to enable said low-level service routines to be booted therefrom, and wherein said controller includes means for causing said switching means to switch the selected portion to said first block in said second portion of the memory device at a predetermined point in the booting of said low-level service routines, to enable said flash file management system to be accessed during a reset procedure.

19. The memory system of claim 17, wherein said switching means is responsive to an access to a predetermined address by the computer system to switch the selected portion to said first portion, and is responsive to consecutive accesses to a predetermined sequence of plural addresses to switch the selected portion to said second portion of the flash memory device.

* * * * *